United States Patent Office 3,001,607
Patented Sept. 26, 1961

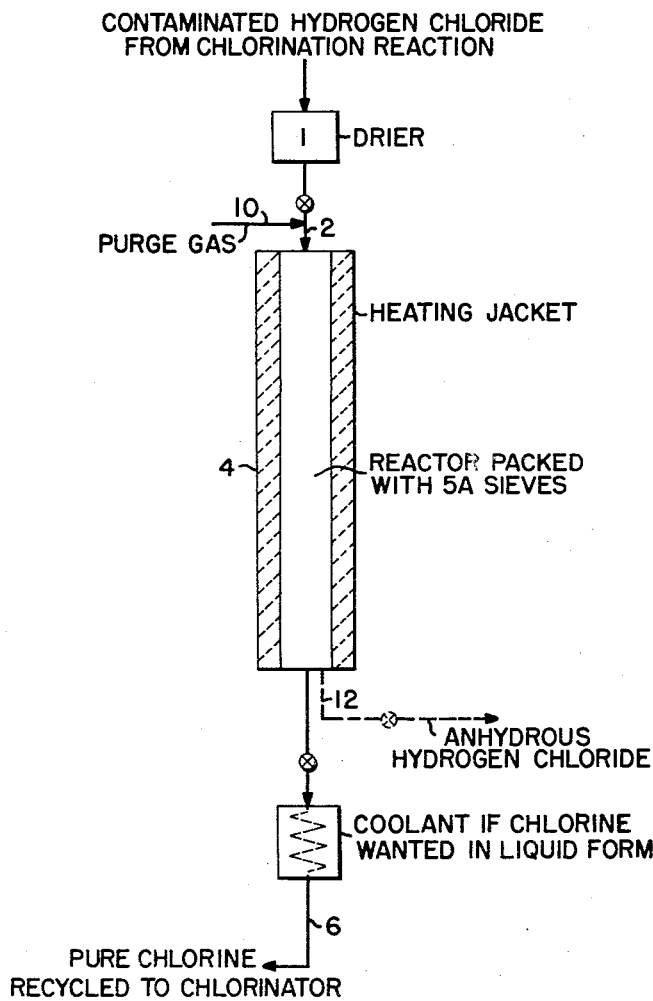

3,001,607
CHLORINE SEPARATION PROCESS
Jackson Eng and Sydney H. J. Greenwood, Sarnia, Ontario, Canada, assignors to Esso Research and Engineering Company, a corporation of Delaware
Filed Nov. 4, 1958, Ser. No. 771,767
4 Claims. (Cl. 183—114.2)

The present invention relates to the purification of chlorine gas. More particularly, the present invention relates to the segregation of chlorine gas from contaminants. Still more particularly, the present invention relates to an improved process for purifying chlorine gas contaminated with hydrogen chloride.

In the chlorination of hydrocarbons one of the by-products is hydrogen chloride and the latter represents 50% of the chlorine supplied to the chlorination process.

In commercial plant operations, the hydrogen chloride formed is almost invariably contaminated with excess and unreacted chlorine. It is important to recover purified HCl and chlorine. Commercially used methods, such as the selective solubility of HCl in water, or liquefaction of the chlorine are expensive. The extreme corrosiveness of hydrochloric acid necessitates special materials in constructing a plant, and the present invention overcomes this obstacle by recovering the gases in an anhydrous form.

In accordance with the present invention, it has been found that substantially pure chlorine can be recovered from mixtures of chlorine and hydrogen chloride gases by use of certain crystalline zeolites which selectively adsorb the hydrogen chloride.

It has been known for some time that certain zeolites, both naturally-occurring and synthetic, have the property of separating normal from isomeric branched chain hydrocarbons, as well as from cyclic and aromatic admixtures. The zeolites have crystal patterns such as to form structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3 to 6 Angstrom units to 12 to 15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabazites and analcite. A synthetic zeolite with molecular sieve properties is described in U.S. 2,442,191. Zeolites vary somewhat in composition, but generally contain silica, aluminum, oxygen and an alkali and/or alkaline earth element, e.g. sodium and/or calcium, magnesium, etc. Analcite has the empirical formula $NaAlSi_2O_6 \cdot H_2O$. Barrer (U.S. 2,306,610) teaches that all or part of the sodium is replaceable by calcium to yield, on dehydration, a molecular sieve having the formula $(CaNa_2)Al_2Si_4O_{12} \cdot 2H_2O$. Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e. the ability to adsorb a straight chain hydrocarbon and exclude the branched chain isomers, are described in an article "Molecular Sieve Action of Solids" appearing in Quarterly Reviews, vol. III, pages 293–330 (1949), and published by the Chemical Society (London).

In accordance with the present invention, chlorine gas containing 20 to 100% of hydrogen chloride is passed through a bed of 5 Angstrom crystalline alumino-silicate zeolite. As the mixture travels through the adsorbent bed, the hydrogen chloride is selectively adsorbed. In further accordance with the present invention, the gas mixture is passed through a bed of sodium or calcium crystalline alumino-silicate having uniform pore openings of 4 to 5 Angstrom units at a temperature of 50° to 200° F. and a pressure of atmospheric to 150 p.s.i.g. until no more HCl is adsorbed. Thereafter the adsorbent is heated to 700° to 1000° F., and substantially all the adsorbed hydrogen chloride is recovered. A small amount of inert purge such as nitrogen may be employed at the end of the heating step to ensure complete removal of hydrogen chloride from the zeolite. The chlorine gas emerges as an unadsorbed effluent. The HCl is recovered by heating.

Molecular sieve adsorbents suitable for use in the process of the invention are available commercially and may be produced in a number of ways. One suitable process for preparing such adsorbents involves the mixing of sodium silicate, preferably sodium metasilicate, with sodium aluminate under carefully controlled conditions. The sodium silicate employed should be one having a ratio of soda to silica between about 0.8 to 1 and about 2 to 1. Water glass and other sodium silicate solutions having lower soda to silica ratios do not produce the selective adsorbent crystals unless they are subjected to extended heat soaking or crystallization periods. Sodium aluminate solutions having a ratio of soda to alumina in the range of from about 1 to 1 to about 3 to 1 may be employed. High soda to alumina ratios are preferred and sodium aluminate solutions having soda to alumina ratios of about 1.5 to 1 have been found to be eminently satisfactory. The amounts of the sodium silicate and sodium aluminate solutions employed should be such that the ratio of silica to alumina in the final mixture ranges from about 0.8 to 1 to about 3 to 1 and preferably from about 1 to 1 to about 2 to 1.

These reactants are mixed in a manner to produce a precipitate having a uniform composition. A preferred method for combining them is to add the aluminate to the silicate at ambient temperatures using rapid and efficient agitation to produce a homogeneous mixture. The mixture is then heated to a temperature of from about 180° to about 215° F. and held at that temperature for a period of from about 0.5 to about 3 hours or longer. The crystals may be formed at lower temperatures but in that case longer reaction periods are required. At temperatures above about 250° F. a crystalline composition having the requisite uniform size pore openings is not obtained. During the crystallization step, the pH of the solution should be maintained on the alkaline side, at about 12 or higher. At lower pH levels, crystals having the desired properties are not as readily formed.

The crystals prepared as described above have pore diameters of about 4 Angstrom units. To convert these to crystals having 5 Angstrom pores, it is necessary to employ a base exchange reaction for the replacement of some of the sodium by calcium, magnesium, cobalt, nickel, iron or a similar metal. Magnesium, cobalt, nickel and iron have greater cracking activity than does calcium and therefore it will often be preferred to employ solutions of these metals for replacement purposes.

The base exchange reaction may be carried out by water washing the sodium alumino-silicate crystals and adding them to a solution containing the desired replacement ions. An aqueous solution of magnesium chloride of about 20% concentration, for example, may be used for preparation of the magnesium form of the 5 Angstrom sieve. After a contact time which may range from about 5 minutes to about an hour, the 5 Angstrom product is filtered from solution and washed free of the exchange liquid. About 50 to 75% of the sodium in the crystals is normally replaced during the base exchange reaction.

The crystals thus prepared are in a finely divided state and are usually pelleted with a suitable binder material before they are calcined in order to activate them. Any of a number of binder agents used in the manufacture of catalysts may be employed for this purpose. A binder consisting of bentonite, sodium silicate and water, for example, has been found satisfactory. In using this binder, the constituents should be mixed so that the product contains from about 5 to 10% bentonite, 5 to 15% sodium silicate and about 75 to 90% of the crystals on a dry basis and that the total mixture contains about 25 to 35% water. This mixture may then be extruded into pellets or otherwise shaped and subsequently dried and calcined. Calcination temperatures of from about 700° to about 900° F. or higher are satisfactory.

To illustrate the process, a hydrogen chloride-chlorine stream, preferably dried by passage through a desiccant, such as concentrated sulfuric acid, is passed as shown in the drawing through drier 1 and line 2 into reactor 4. The dried feed stream is admitted into adsorber 4 at a temperature of from about 75° to 150° F. Similarly, the adsorber may be provided with heating means and, during the adsorption step, is maintained at a temperature of 75° to 200° F. Hydrogen chloride is selectively adsorbed into the interstices of the adsorbent and the effluent, during the adsorption cycle, is withdrawn through lne 6 and is substantially free chlorine. This may be passed directly to the chlorination zone, when hydrocarbons are being chlorinated or employed for any other desired purpose.

When no more HCl is adsorbed the feed through line 2 is halted and may be diverted into another adsorber in parallel. Temperature of the bed is now raised to a level of 700° to 1000° F. and hydrogen chloride is desorbed. If desired, small amounts of purge gas such as $N_2$ may be admitted through line 10, particularly toward the end of the desorption to aid in the removal of residual traces of HCl remaining in the adsorber. The hydrogen chloride stream is withdrawn through line 12. Thereafter the bed is cooled and the contaminated chlorine gas is reintroduced through line 2. For an uninterrupted process two or more adsorption columns are used so that chlorine feed may be processed in one of the units during regeneration of the other unit.

It is an important element of the present invention that a substantially anhydrous system obtains throughout. Thus, prior to the adsorption cycle, it is important that the bed be dry. Prior to introducing the feed, the bed is heated to a temperature of about 800° to 1000° F. in the presence of a purge gas to remove any adhering water.

EXAMPLE 1

The experimental laboratory data which this invention is based upon are summarized in Table I. Five cycles of sorption and desorption were carried out on the same batch of sieves. The composition of the feed was varied from 20% hydrogen chloride in chlorine mixture to 100% hydrogen chloride. The feed rate based on volume of hydrogen chloride gas/volume of sieves over one hour was also varied from 25 to 55 v./v./hr. In all cases, excellent selectivity for adsorbing hydrogen chloride was obtained.

With the exception of the first cycle sorption, the amount of hydrogen chloride sorbed and desorbed was approximately 3.5 grams for 100 grams of sieves. After the first cycle, there appears to be no loss in capacity. The greater capacity of the fresh sieves can be due to several reasons. One reason is that the initial increment of hydrogen chloride sorbed by the sieves is held on so strongly that it cannot be desorbed. Subsequent increments are not held on as strongly and hence can be readily recovered by heating. Thus the sieve capacity after the first cycle remained constant at a somewhat lower value than sorption with fresh sieves. Thus the result shown in Table I indicate that a process employing 5 Angstrom molecular sieves for recovering and purifying hydrogen chloride from hydrocarbon chlorinating operations is feasible.

*Table I*

SORPTION OF HYDROGEN CHLORIDE GAS ON 5 ANGSTROM MOLECULAR SIEVES [1]

| Cycle No. | | Feed | Temp., °F. | HCl Rate, v./v./hr. | Time, Hours | Raffinate or Desorbate [2] | HCl Sorbed or Desorbed, g./100 g. Sieves |
|---|---|---|---|---|---|---|---|
| 1 | Sorption | 100% HCl | [3] 80 | 31 | 2.5 | | 14 |
|   | Desorption | | 80–850 | | 2.2 | 100% HCl | 4 |
| 2 | Sorption | 100% HCl | 80 | 30 | 1.0 | | 3.5 |
|   | Desorption | | 80–850 | | 2 | 100% HCl | 3 |
| 3 | Sorption | 100% HCl | 85 | 30 | | | 3 |
|   | Desorption | | 85–850 | | | 100% HCl | 3 |
| 4 | Sorption | 30% HCl / 70% Cl₂ | 75 | 55 | 2.3 | 100% Cl₂ | 3 |
|   | Desorption | | 75–830 | | 2 | 99% HCl | 3.5 |
| 5 | Sorption | 20% HCl / 80% Cl₂ | 85 | 25 | 0.5 | 100% Cl₂ | 3.5 |
|   |   | 70% HCl / 30% Cl₂ | 85 | 35 | 0.5 | 100% Cl₂ | |
|   | Desorption | | 85–830 | | 2 | 99% HCl | 3.5 |

[1] 350 grams of 5 Angstrom molecular sieves, initially pre-dried at 850° F. with nitrogen purging were used to sorb HCl at atmospheric pressure.
[2] Composition determined by titrations involving standard base, potassium iodide-thiosulfate-starch methods.
[3] Hot zone moving through the sieve bed due to heat of sorption was approximately 125° F.

EXAMPLE 2

The substantial unsuitability of a silica-alumina composition such as Attapulgus clay for this separation is shown in the data in Table II.

Table II

SORPTION OF HYDROGEN CHLORIDE ON ATTAPULGUS CLAY [1]

Sorption conditions—80° F., 750 mm. Hg, HCl rate 10 v./v./hr.
Desorption—Sieves heated to 850° F.

| Run No. | | Feed | Amount Sorbed,[2] g./100 g. Clay | Amount Desorbed, g./100 g. Sieves |
|---|---|---|---|---|
| 1 | Sorption | 100% HCl | 0.8 | |
|   | Desorption | | | 0.6 |
| 2 | Sorption | 100% HCl | 1.0 | |
|   | Desorption | | | 0.6 |
| 3 | Sorption | 100% HCl | 0.7 | |
|   | Desorption | | | 0.6 |
| 4 | Sorption | 17% HCl / 83% Cl$_2$ | 0.7 | |
|   | Desorption | | | [3] 0.7 |

[1] 360 grams Attapulgus clay initially dried at 850° F. with nitrogen purging.
[2] Temperature increased to approximately 105° F. due to heat of sorption.
[3] Hydrogen chloride contaminated with 26 vol. percent chlorine, as determined by titration involving standard base, potassium iodide-thiosulfate-starch methods.

These data show that less than 1 gram of hydrogen chloride was sorbed per 100 grams of clay. Furthermore, with clay the desorbed hydrogen chloride was contaminated with chlorine (26 vol. percent).

What is claimed is:

1. An improved process for purifying chlorine gas contaminated with hydrogen chloride which comprises contacting said mixture with a crystalline metallic aluminosilicate zeolite having uniform pore openings from 4 to 5 Angstrom units at a temperature of about 50° to 200° F., selectively adsorbing said hydrogen chloride, withdrawing unadsorbed chlorine, thereafter raising the temperature of said zeolite to about 700° to 1000° F., and recovering substantially pure hydrogen chloride.

2. The process of purifying chlorine gas contaminated with hydrogen chloride which comprises passing a chlorine containing gas stream contaminated with up to 100% hydrogen chloride into a bed of metallic crystalline alumino-silicate zeolite having a uniform pore opening of about 5 Angstroms in an adsorption zone, maintaining a temperature of about 50° to 150° F. in said zone, selectively adsorbing HCl, withdrawing unadsorbed Cl$_2$ from said zone, thereafter increasing said temperature from 700° to about 1000° F., and recovering substantially pure hydrogen chloride.

3. The process of claim 2 wherein said mixture is dried prior to passage through said adsorption zone.

4. The process of claim 2 wherein an inert gas purge is employed during the desorption stage.

References Cited in the file of this patent

UNITED STATES PATENTS 2,800,197    WynKoop    July 23, 1957

OTHER REFERENCES

Adsorption by C. L. Mantell, first edition, McGraw-Hill Book Co., Inc., New York, 1945, page 12.

J. Soc. Chem. Ind., vol. 64, May 1945, pages 130–135.